(12) United States Patent
Kraemer

(10) Patent No.: US 6,394,688 B1
(45) Date of Patent: May 28, 2002

(54) FOLD-OUT WIPER ARM

(75) Inventor: Godelieve Kraemer, Huegelsheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/744,083

(22) PCT Filed: May 25, 2000

(86) PCT No.: PCT/DE00/01697

§ 371 (c)(1),
(2), (4) Date: Jan. 19, 2001

(87) PCT Pub. No.: WO00/73109

PCT Pub. Date: Dec. 7, 2000

(30) Foreign Application Priority Data

Jun. 2, 1999 (DE) .......................... 199 25 388

(51) Int. Cl.⁷ ................................. F16D 3/00
(52) U.S. Cl. ................. 403/111; 15/250.34; 15/250.19; 15/250.352
(58) Field of Search ..................... 403/111, 84; 15/313, 15/250.352, 250.351, 250.19, 250.202, 250.34

(56) References Cited

U.S. PATENT DOCUMENTS 3,548,442 A * 12/1970 Stratton ................... 15/250.34
4,050,832 A   9/1977 Stratton
4,674,145 A * 6/1987 Epple ....................... 15/250.19

FOREIGN PATENT DOCUMENTS

| DE | 3714651 | * 10/1988 | ............. B60S/1/34 |
| DE | 37 14 651 A | 11/1988 | |
| EP | 0 788 951 A | 8/1997 | |
| GB | 1045222 | * 10/1966 | ............. 15/250.352 |
| GB | 2069325 A | * 8/1981 | ............. 15/250.352 |

* cited by examiner

Primary Examiner—Lynne H. Browne
Assistant Examiner—Michael P Ferguson
(74) Attorney, Agent, or Firm—Michael J. Striker

(57) ABSTRACT

A wiper arm that can be pivoted out of the way, in particular for motor vehicles, having a fastening part (2) and a hinge-part (3), which are joined together via a wiper arm hinge (4) in such a way that the hinge part (3) can be pivoted out of the way about the wiper arm hinge (4), thereby reaching a locking means (14), and further having a tension spring (8) and a hoop spring (9), wherein the hoop spring (9) has clamping segments (9.3, 9.4), and that the fastening part has an extension (13) with bearing faces (14.1, 14.2), on which the clamping segments (9.3, 9.4) of the hoop spring (9) rest in the position pivoted out of the way of the hinge part (3).

7 Claims, 4 Drawing Sheets

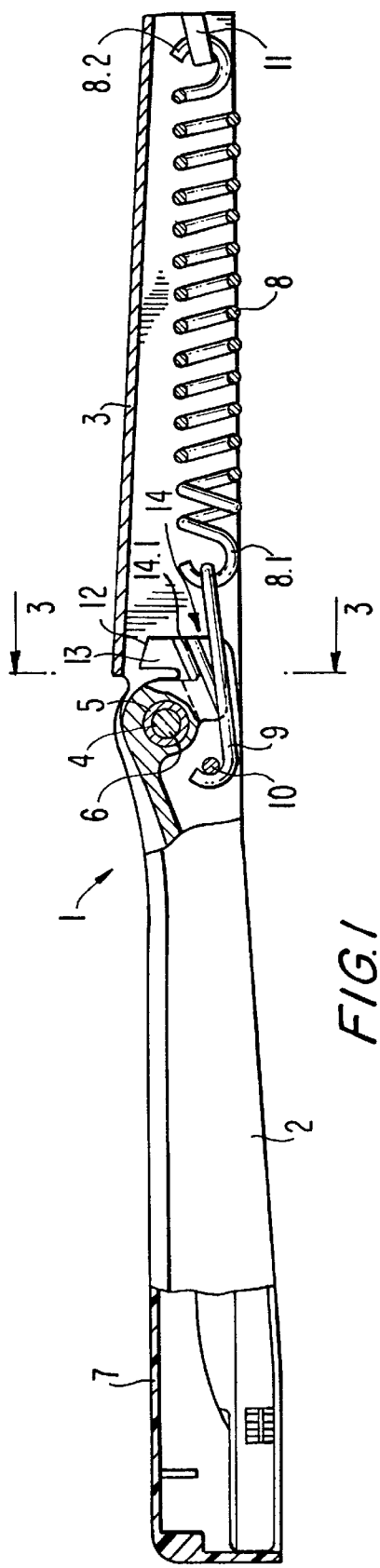
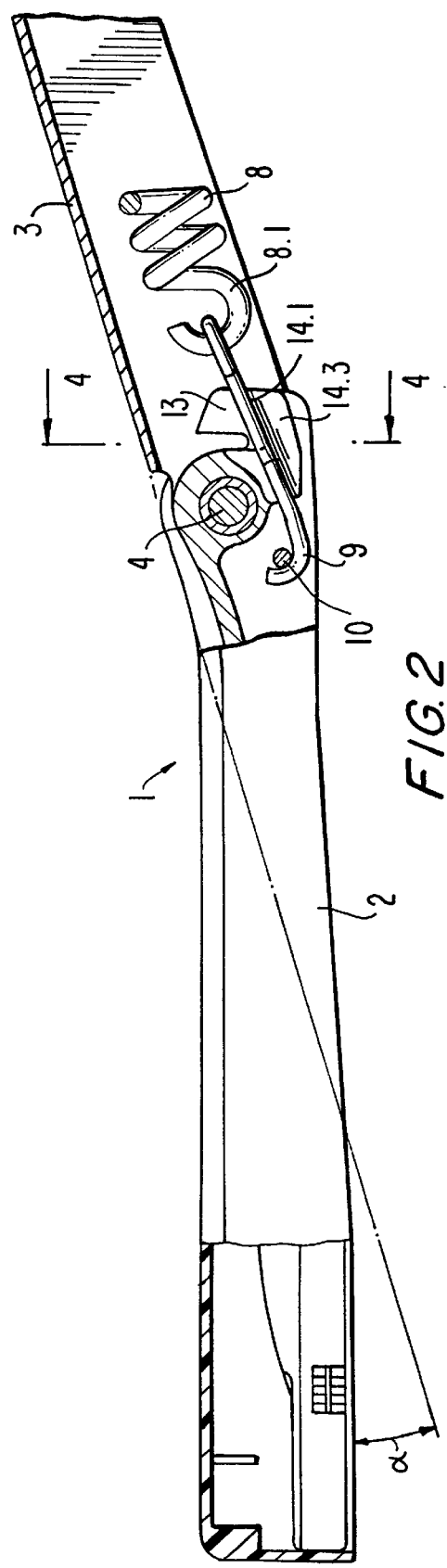

FOLD-OUT WIPER ARM

FIELD OF THE INVENTION

The invention relates to a wiper arm that can be pivoted out of the way, in particular for motor vehicles, which can be put by pivoting into a first, spring-loaded working position and can assume a second position in a position pivoted out of the way from the work position.

The wiper arms are pulled via a tension-loaded spring toward the windshield of a motor vehicle. To replace a wiper blade, the wiper arm must be pivoted into a position in which a wiper blade is brought to a distance from the windshield, and locking must be done in this position. This locking prevents the wiper arm, pivoted out of the way with attendant elongation of the tension spring, from snapping back again.

PRIOR ART

For the sake of locking, it is known to provide a hoop spring, connected to the tension spring, at the suspension point; during the rotation of the wiper arm, the hoop spring is drawn toward the wiper arm hinge, thus overtaking a tilting point so that the wiper arm when pivoted out of the way does not snap back again. The angle of pivoting out of the way is as a rule quite large in this case, and thus the wiper arm assumes quite a high position in which it is pivoted out of the way.

Furthermore, if two tension springs located side by side and retained by one common hoop spring are used, it is also known to provide a pin, which is loaded by a third spring and which when the wiper arm is pivoted out of the way is pressed into a recess by a tappet connected to the wiper arm. Although this makes a lower position of the wiper arm pivoted out of the way possible, nevertheless it is disadvantageous that a third spring is required for secure locking.

A further known locking means for pivoting out of the way provides that when the wiper arm is pulled upward a ring, which is mounted with sufficient play on a pin and is surrounded by a spring eyelet, is slipped onto a detent cam. The ring is first slipped forward over the cam, counter to the spring force, and then snaps into place. The new position is maintained by the spring tension, and the wiper arm remains stopped in its position pivoted out of the way, so that a low position pivoted out of the way is made possible.

SUMMARY OF THE INVENTION

Compared with the known versions, in the wiper arm defined by claim 1 no additional part is needed, and at the same time reliable locking is assured.

The bearing faces can be disposed on a center rib of the extension or on inner side walls of the extension. To establish uniform loading, the hoop spring can have two legs, which include a receiving region for the tension spring and a clamping region. To assure secure support on the fastening part, the hoop spring in the region of the support can have substantially parallel, immediately adjacent leg portions. The extension can also have a guide and the hoop spring can have a contouring corresponding to the guide, and as a result the hoop spring is additionally guided during the operation of spreading it open as the hinge part is folded out of the way. The shaping of the hoop spring can be integrated with the mold for the tension spring eyelet, so that one hoop spring can be dispensed with.

Finally, a stop face for limiting the hinge travel and cooperating with the hinge part can be provided on the extension. The stop face can also be accommodated in the fastening part, such as a stop for the hoop spring acting as an upper limit of the angle of motion for pivoting out of the way.

DRAWING

In the drawing, one exemplary embodiment according to the invention is shown.

FIG. 1 shows a wiper arm in the parking position in longitudinal section view;

FIG. 2 shows the wiper arm of FIG. 1 in the position pivoted out of the way;

EXEMPLARY EMBODIMENT

Figure 3:
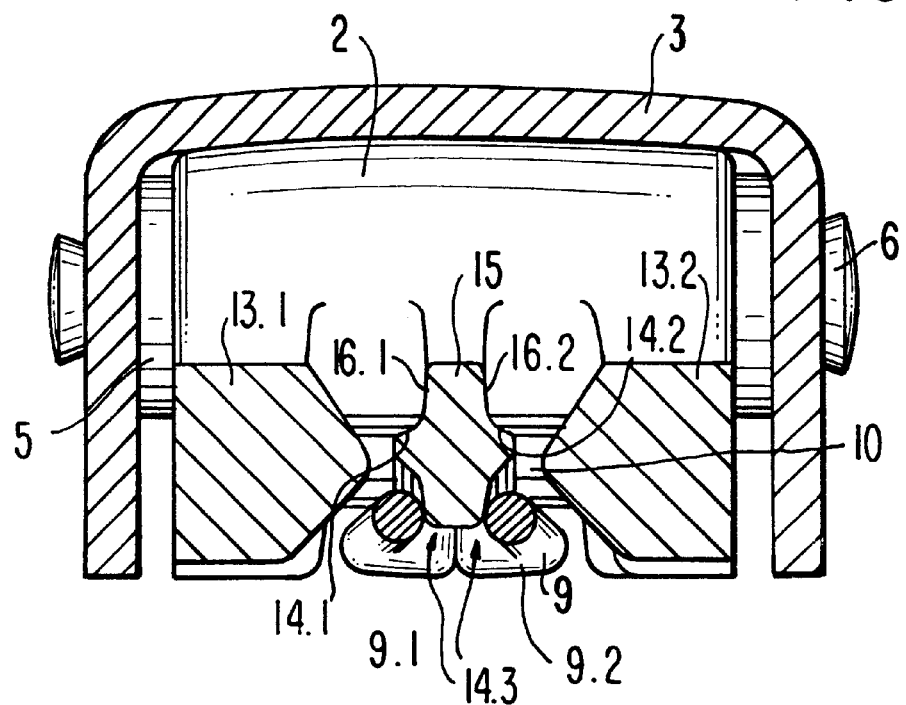
FIG. 3 shows a section taken along the line AA of FIG. 1.

In FIG. 1, a wiper arm is shown in the parking position, that is, with the wiper blade resting on a windshield. The wiper arm 1 has a fastening part 2 and a hinge part 3, which are joined together by means of a wiper arm hinge 4, comprising a bearing bush 5 and a rivet pin 6. A cap 7 is also mounted on the fastening part 2; it can be pivoted about the wiper arm hinge 4 for the sake of fastening the fastening part to a pivot peg.

The wiper arm hinge 4 makes it possible to pivot the hinge part 3 out of the way relative to the fixed fastening part 2, counter to the force of a prestressed tension spring 8. The tension spring 8 is suspended by one end 8.1 from a hoop spring 9, which in turn is suspended from a pin 10 connected to the fastening part 2. The other end 8.2 of the tension spring 8 is suspended in an eyelet 11 of the hinge part 3. The hoop spring 9 can also be omitted, in which case the eyelet 8.1 is replaced by a mold eyelet which also performs the purpose of the hoop spring.

To limit the oblique position present because of the prestressing of the tension spring 8 in the absence of contact of the wiper arm or wiper blade with the windshield, a bearing face 12 which cooperates with a suitable wall portion of the hinge part 3 is provided on the fastening part 2. This bearing face 12 is disposed on an extension 13 of the fastening part 2 that extends past the wiper arm hinge 4. This extension 13 furthermore has the function of assuring locking of the hinge part 3 that is pivoted out of the way.

In FIG. 2, the wiper arm 1 is shown in a position pivoted out of the way, and for the sake of greater clarity in the drawing, the cap on the fastening part 2 has not been shown. The hinge part 3 has been folded away from the windshield relative to the fastening part 2 by a pivot angle $\alpha \leq 30°$, and the hoop spring 9 is locked by a cam 14 on the extension 13. To that end, the hoop spring 9 and the extension 13 are embodied in a special way, as will be described below.

In FIG. 3, a section along the line AA of FIG. 1 is shown. The hinge part 3 can be seen, which curves like a hood over the extension 13 on the end of the fastening part 2. The wiper arm hinge is indicated by the bearing bush 5 and the rivet pin 6.

The extension 13, in its middle, has a rib 15 extending in the direction of the tension spring 8, or in other words longitudinally of the wiper arm; the cam support 14.1, 14.2 of the cam 14 is provided on this rib, on each of its sides 16.1, 16.2. The cam 14 disposed on the rib 15 has a bell-shaped end 14.3 in cross section, the base of the bell being formed by the cam supports 14.1, 14.2.

The end 14.3 of the cam is enclosed by two legs 9.1, 9.2 of the hoop spring 9; in the regions, indicated by the arrows, between the hoop spring 9 and the end 14.3 of the cam, at most only a slight contact is allowable in the operating range of the wiper arm. Preferably, however, no contact at all occurs in this position, so that no frictional forces that could impair the action of the tension spring will arise.

The tines 13.1 and 13.2 of the extension 13 are the sectional faces shown in the section A—A.

Instead of a rib 15 and the mounted cam 14 with the cam support 14.1 and 14.2 and the bell-shaped end 14.3, corresponding bearing faces similar to the bearing faces 14.1 and 14.2 can be provided on the respective tines 13.1 and 13.2 of the extension 13, so that the hoop spring instead of being spread apart is compressed.

Figure 4:
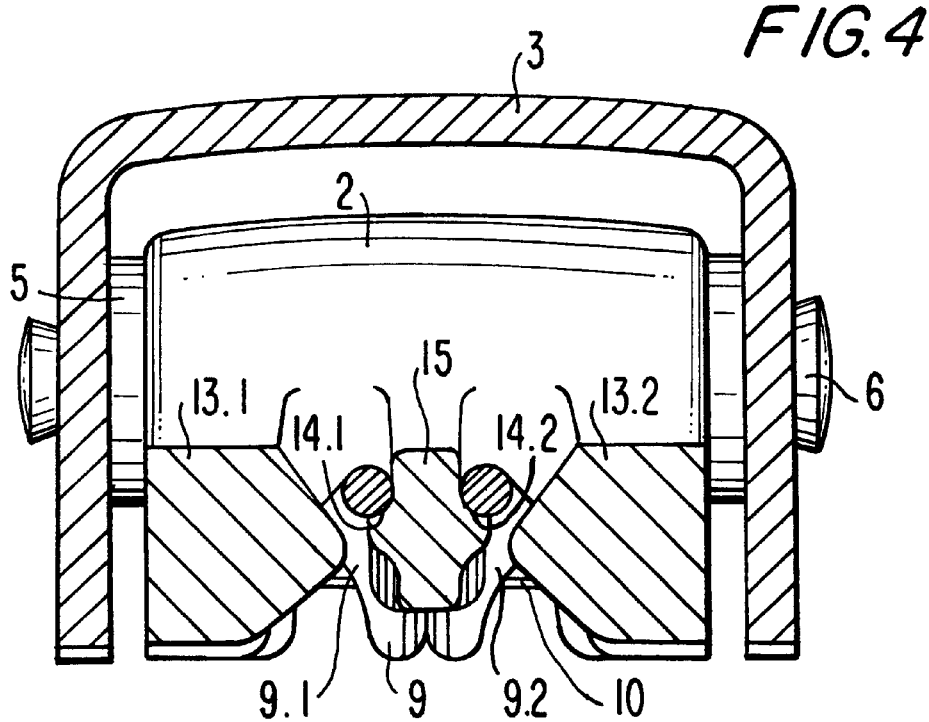
FIG. 4 shows a section along the line BB of FIG. 2.

In FIG. 4, the hoop spring 9 is shown in its position on the center rib 15, with the wiper arm that has been pivoted out of the way. The legs 9.1, 9.2 now rest, offset toward the middle of the wiper arm, on the cam supports 14.1, 14.2 in such a way that locking is assured despite the spring force of the tension spring 8.

Figure 5:
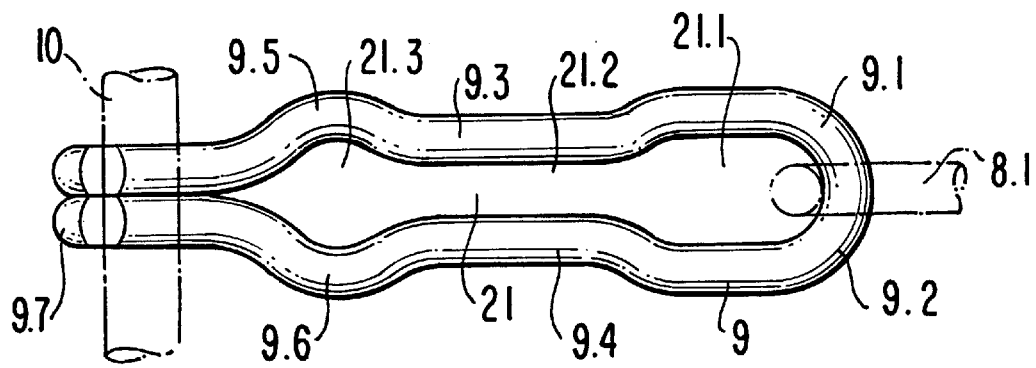
FIG. 5 shows a hoop spring in plan view.

To achieve this, an especially designed hoop spring 9 shown in FIG. 5 is provided. The hoop spring 9 has two legs 9.1, 9.2. These legs 9.1, 9.2 are substantially parallel to one another, but only in the region of the support on the bolt 10 can the legs 9.1, 9.2 rest on one another. Otherwise, they enclose an interstice 21, which is engaged by the tension spring 8 on the end 8.1 opposite the bolt 10. To that end, the space 21 has a widened portion 21.1, which is widened compared with a clamping space 21.2 disposed approximately in the middle region. This clamping space 21.2 is defined by the portions 9.3, 9.4 of the respective legs 9.1 and 9.2, which in the position of the wiper arm pivoted out of the way rest on the cam supports 14.1, 14.2 along the end 14.3 of bell-shaped cross section of the cam 14.

The clamping space 21.2 is adjoined by a receiving space 21.3, toward the end suspended from the pin 10, and this space is also widened compared to the clamping space 21.2. By means of the circular-arclike receiving portion 9.5 and 9.6, the elasticity of the hoop spring is advantageously changed, which creates a capability of guidance for the hoop spring 9.

When the bearing faces 14.1 and 14.2 are made on the extension 13.1 and 13.2, respectively, so that the hoop spring is compressed when the wiper arm is pivoted out of the way, the interstices 21.1, 21.2 and 21.3 and correspondingly the limitations 9.1, 9.2, 9.3, 9.4, 9.5 and 9.6 can also be in a different proportion from what is shown, so as to achieve the same locking function upon the pivoting out of the way.

Figure 6:
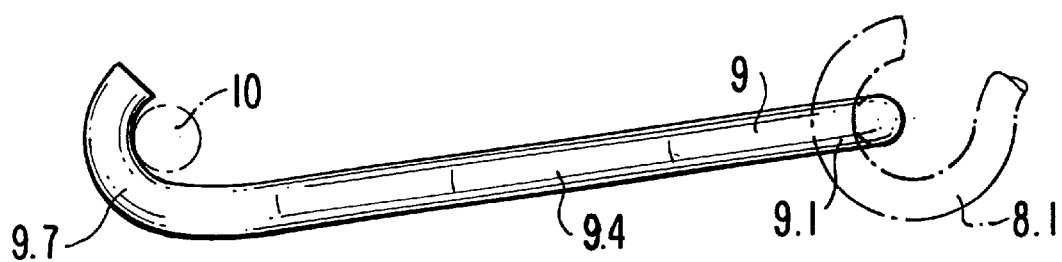
FIG. 6 shows the hoop spring of FIG. 5 in a side view.

In FIG. 6, a side view of the hoop spring 9 is shown, illustrating the substantially plane structure of the hoop spring, except for a hooklike-curved anchoring region 9.7 around the pin 10.

Figure 7:
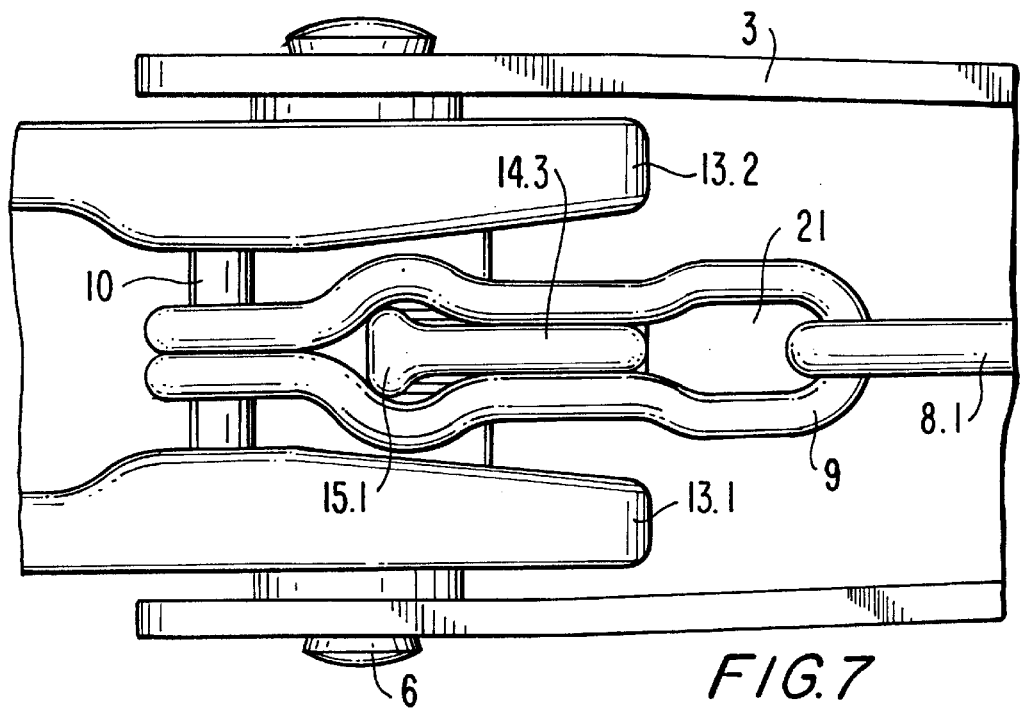
FIG. 7 is a view from below in the region of the hinge of the wiper arm of FIG. 1.
Figure 8:
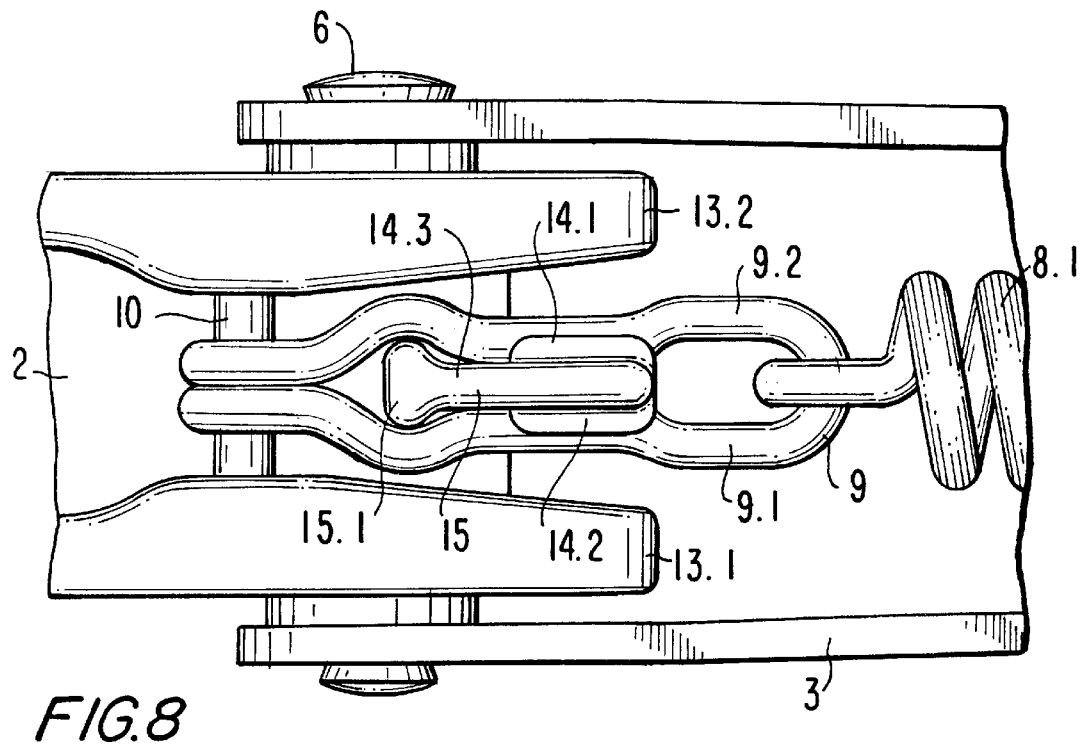
FIG. 8 is a view from below of the wiper arm in the position pivoted out of the way in accordance with FIG. 2.

FIGS. 7 and 8 show the embodiment of the locking between the cam 14 and the hoop spring 9 with more precision. In FIG. 7, the wiper arm is shown in its position of repose, that is, resting on the windshield. The hoop spring 9, from which the tension spring is suspended by its end 8.1, is hooked onto the bolt 10 and with its interior 21 it surrounds the cam 14 of the center rib 15. As already noted, at most only a loose contact occurs here. The middle rib 15 has a thickened portion 15.1, which extends into the plane of the drawing. This thickened portion 15.1 comes to rest approximately in the circular-arclike region 9.5, 9.6 of the hoop spring 9 and assures its guidance during the process of pivoting out of the way.

In FIG. 8, the hoop spring 9, as a result of pivoting of the hinge part 3 out of the way relative to the fastening part 2, has been guided over the cam support 14.1, 14.2 along the bell-shaped end 14.3; in the process, the hoop spring 9 has spread open and then after sliding past the cam supports 14.1, 14.2 has closed again. It is understood that for this spreading open of the legs 9.1, 9.2 of the hoop spring 9, a suitable force must be exerted, which assures secure locking after the legs 9.1, 9.2 have snapped into place behind the cam support 14.1, 14.2. The locking is exposed essentially to the forces operative as a result of gravity. In addition to the weight of the hinge part 2, the weight of a wiper blade is also involved, so that because of the lever arm, adequate spring stiffness must be assured for the hoop spring 9. The operation of the hoop spring 9 is independent of the spring force exerted by the tension spring 8.

The thickened portion 15.1 assures additional guidance during the process of spreading the hoop spring 9 open.

It will be noted once again that the hoop spring 9, in the parking position of the wiper arm, is not in engagement with the cam 14 of the center rib 15; this engagement does not occur until the hinge part has been pivoted out of the way for the sake of locking in the position pivoted out of the way, for example in order to replace a wiper blade.

What is claimed is:

1. A wiper arm that can be pivoted out of the way, in particular for motor vehicles, having a fastening part (2) and a hinge part (3), which are joined together via wiper arm hinge (4) in such a way that the hinge part (3) can be pivoted out of the way about the wiper arm hinge (4), thereby reaching a locking means (14), and further having a tension spring (8) and a hoop spring (9), characterized in that the hoop spring (9) has clamping segments (9.3, 9.4), and that the fastening part has an extension (13) with bearing faces (14.1, 14.2), on which the clamping segments (9.3, 9.4) of the hoop spring (9) rest in the position pivoted out of the way of the hinge part (3).

2. The wiper arm that can be pivoted out of the way of claim 1, characterized in that the bearing faces (14.1, 14.2) are disposed on inner side walls (13.1, 13.2) of the extension (13).

3. The wiper arm that can be pivoted out of the way of claim 1, characterized in that the hoop spring (9) has two legs (9.1, 9.2), which include a receiving region (21.1) for the tension spring (8) and a clamping region (21.2).

4. The wiper arm that can be pivoted out of the way of claim 3, characterized in that the hoop spring (9) has a guide segment (9.5, 9.6) with regard to the fastening part (2).

5. The wiper arm that can be pivoted out of the way of claim 3, characterized in that the hoop spring (9), in the region of its support on the fastening part (2), has substantially parallel, immediately adjacent leg portions.

6. The wiper arm that can be pivoted out of the way of claim 1, characterized in that the extension (13) has a stop face (12), cooperating with the hinge part (3), for limiting the hinge travel.

7. The wiper arm that can be pivoted out of the way of claim 1, characterized in that the extension (13) has a guide (15.1), and that the hoop spring (9) has a contouring (9.5, 9.6) corresponding to the guide (15.1.).

* * * * *